United States Patent [19]
Wood et al.

[11] 3,925,606
[45] Dec. 9, 1975

[54] SCAN CONVERSION APPARATUS

[75] Inventors: Kenneth E. Wood, Annapolis; William F. Parrish, Baltimore, both of Md.; Paul G. Kennedy, Monroeville, Pa.

[73] Assignee: Westinghouse Electric Corporation, Pittsburgh, Pa.

[22] Filed: June 10, 1974

[21] Appl. No.: 478,127

[52] U.S. Cl. .......................... 178/6.8; 178/DIG. 24
[51] Int. Cl.² .......................................... H04N 7/18
[58] Field of Search ...................... 178/6.8, DIG. 24

[56] References Cited
UNITED STATES PATENTS

| | | | |
|---|---|---|---|
| 3,792,194 | 2/1974 | Wood | 178/6.8 |
| 3,806,644 | 4/1974 | Browne | 178/DIG. 24 |
| 3,830,971 | 8/1974 | van de Polder | 178/DIG. 24 |

Primary Examiner—Howard W. Britton
Attorney, Agent, or Firm—D. Schron

[57] ABSTRACT

Periodic signals, for example sonar returns, to be displayed on a conventional television monitor are sampled and put into storage registers at a first rate. The storage registers are emptied at a second rate and the information is placed onto a video magnetic disk. For each sonar transmission a number of samples of the return signal are placed into, and read out of, the storage registers, during each revolution of the disk, as the return is coming in, to build up a television display signal indicative of the sonar return.

8 Claims, 10 Drawing Figures

SCAN CONVERSION APPARATUS

BACKGROUND OF THE INVENTION

1. Field of the Invention

The invention in general relates to scan conversion apparatus, and particularly to such apparatus which utilizes a rotating storage medium such as a magnetic disk.

2. Description of the Prior Art

Scan conversion apparatus finds applicability in a number of different fields of use. For example in a side looking sonar system, acoustic energy is projected toward a target area, generally the sea bottom, in a certain beam pattern such that the sound energy impinges upon the bottom and sweeps out an elongated narrow insonified strip. Reflected acoustic energy containing information relative to the bottom, or targets on the bottom, is received, processed and displayed, generally on a paper recorder. Multiple transmissions take place as the vehicle proceeds along its course and for many operations it would be desirable to display the side looking sonar picture on a conventional TV monitor.

In another field of use, scan conversion apparatus is utilized for slow scan TV systems wherein a television picture may be transmitted at a reduced data rate over a reduced channel bandwidth such as a conventional telephone line.

An improved form of scan conversion apparatus useful for such fields is described in U.S. Pat. No. 3,792,194 assigned to the present assignee. That patent describes apparatus which receives sequential input signals from a system and places them onto a rotating magnetic video disk for displaying on a conventional TV monitor. As the signal comes in, it is sampled a predetermined number of times. For example, approximately 500 samples are taken and the samples are converted to digital form and placed into a storage register unit. After all of the samples of the entire signal have been taken and placed into the storage registers they are read out and converted into analog form, at a predetermined readout rate and placed onto the magnetic disk, the readout rate being such that the signal is, in essence, compressed to a time duration substantially equal to a displayed TV line.

The present invention relates to a somewhat similar system which may utilize a video magnetic disk but wherein the total shift register storage requirements may be substantially reduced and yet provide the desired resolution in the horizontal direction. That is, a greater number of samples of an input signal may be taken while using fewer storage registers, than the previously described system.

SUMMARY OF THE INVENTION

The apparatus of the present invention includes a display means such as a conventional TV monitor for displaying multiple lines of information each corresponding to a respective input signal. The input signal is periodically sampled and placed into a first storage means such as storage registers, at a first rate and are read out therefrom at a second rate and placed into a second storage means such as a rotating magnetic disk. The shift registers are filled and emptied once per disk rotation between successive inputs and the contents of the shift registers for each readout is placed onto the disk as a portion of a display signal. Circuit means are provided for reading out all of the stored portions of a display signal to provide a total display signal, that is, one TV line for the monitor display.

DESCRIPTION OF THE PREFERRED EMBODIMENT

Although the present invention can be used with a variety of systems, it will be described by way of example in conjunction with a sonar system such as a side-looking sonar system designated by the block 10 in FIG. 1. The sequential side looking sonar return signals are applied to input 12 for subsequent display on a TV monitor 14 one example of which has a standard 525 line picture which employs a two to one interlace for flicker-free presentation. Thirty frames per second are presented, each frame being made up of an odd and even interlaced field, with each TV line, including blanking, having a period of 63.5 microseconds. Each sonar return is of a time duration which far exceeds the time it takes to scan one TV line and so the signal is compressed so that it may be properly displayed. To accomplish this conversion, there is provided a first storage means in a form of a shift-register unit 15, and a second storage preferably in the form of a rotating magnetic video disk 16, the technology of which is well known to those skilled in the art.

An analog to digital converter 20, governed by timing and control circuit 22, periodically samples the input signal, holds the sampled value, converts it into an equivalent digital form, and places it into the shift register unit 15. If each sample is converted into a six bit digital signal for example, the shift register unit 15 could be six parallel shift registers which shift the digital information down at the sampling rate.

The timing and control circuit 22 governs the reading out of the shift registers 15 into the digital to analog converter 24 and the operation is such that the filling up and reading out of the shift registers 15 occurs periodically during the time period between successive input signals, and in the present example the filling up and reading out will occur for every revolution of the disk 16, where the rotational speed of the disk is 3600 rpm, equivalent to the field rate of the TV monitor 14.

With a 2:1 interlace operation, the disk 16 includes a first track TK1 for recording display signals of the odd field, and a second track TK2 for recording display signals of the even field. Prior to storage on the disk 16, the signals from the digital to analog converter 24 are processed in a signal conditioning circuit 28 which may include for example such circuitry as preamplifiers, filters, etc. The processed signals are then gated to either one of two magnetic read/write heads 31 or 32 depending upon which one of two gates G1 or G2 is enabled by the timing and control circuit 22. For reading the display signals recorded on the disk 16 there is provided gates G3 and G4 which are respectively connected to heads 31 and 32, and which are alternately enabled on each revolution of the disk 16, by means of enabling signals provided by the timing and control circuit 22.

If desired another signal conditioning circuit 34 may be provided prior to presentation of the display signals to the TV monitor 14.

For the sonar arrangement described, the sonar returns will not have any synchronizing or blanking information for a TV presentation, and accordingly, there is provided a sync generator 37 which may be governed by the timing and control circuit 22 for providing the proper synchronizing and blanking pulses necessary for TV operation.

Figure 1:
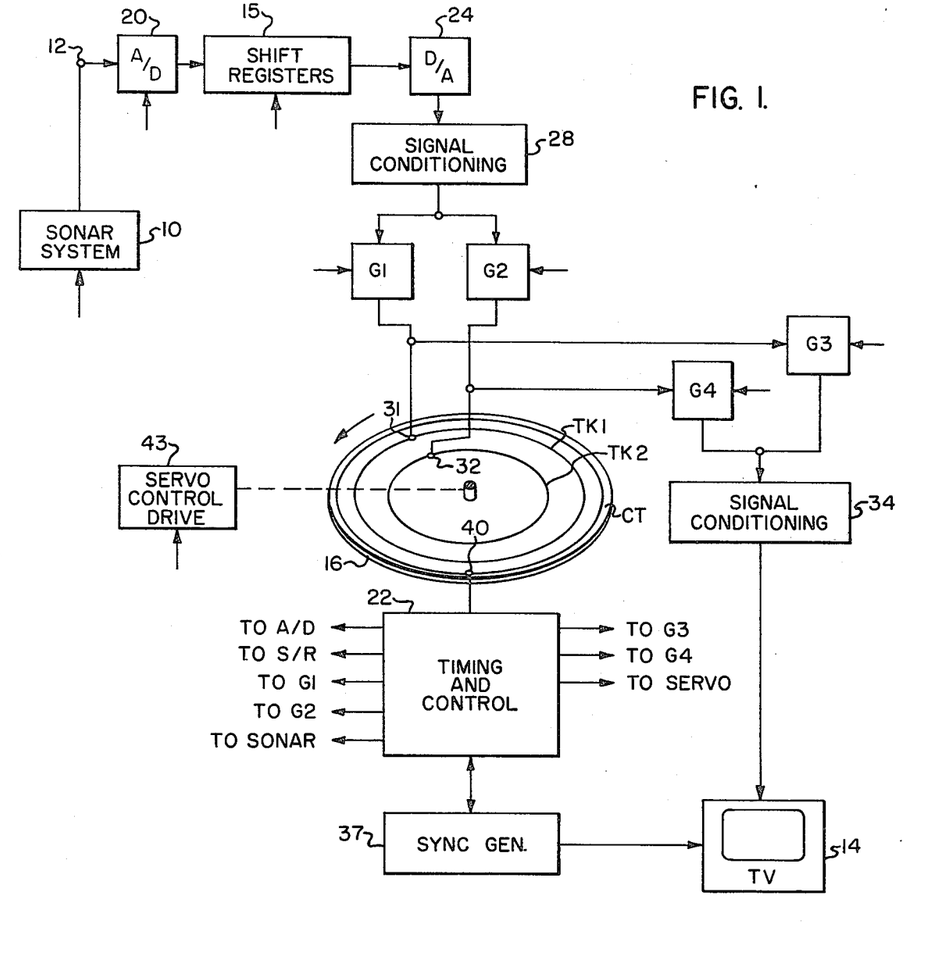
FIG. 1 illustrates a preferred embodiment of the present invention, as applied to a side looking sonar system.

Various timing operations may be governed by a crystal oscillator and/or as illustrated in FIG. 1, by means of a pre-recorded clock track CT which provides clock pulses to the timing and control circuits 22 by means of a magnetic read head 40.

To maintain proper rotational speed of the disk 16, there is generally provided some sort of feedback control, such control being illustrated in FIG. 1 as the servo-control drive 43.

Figure 2:
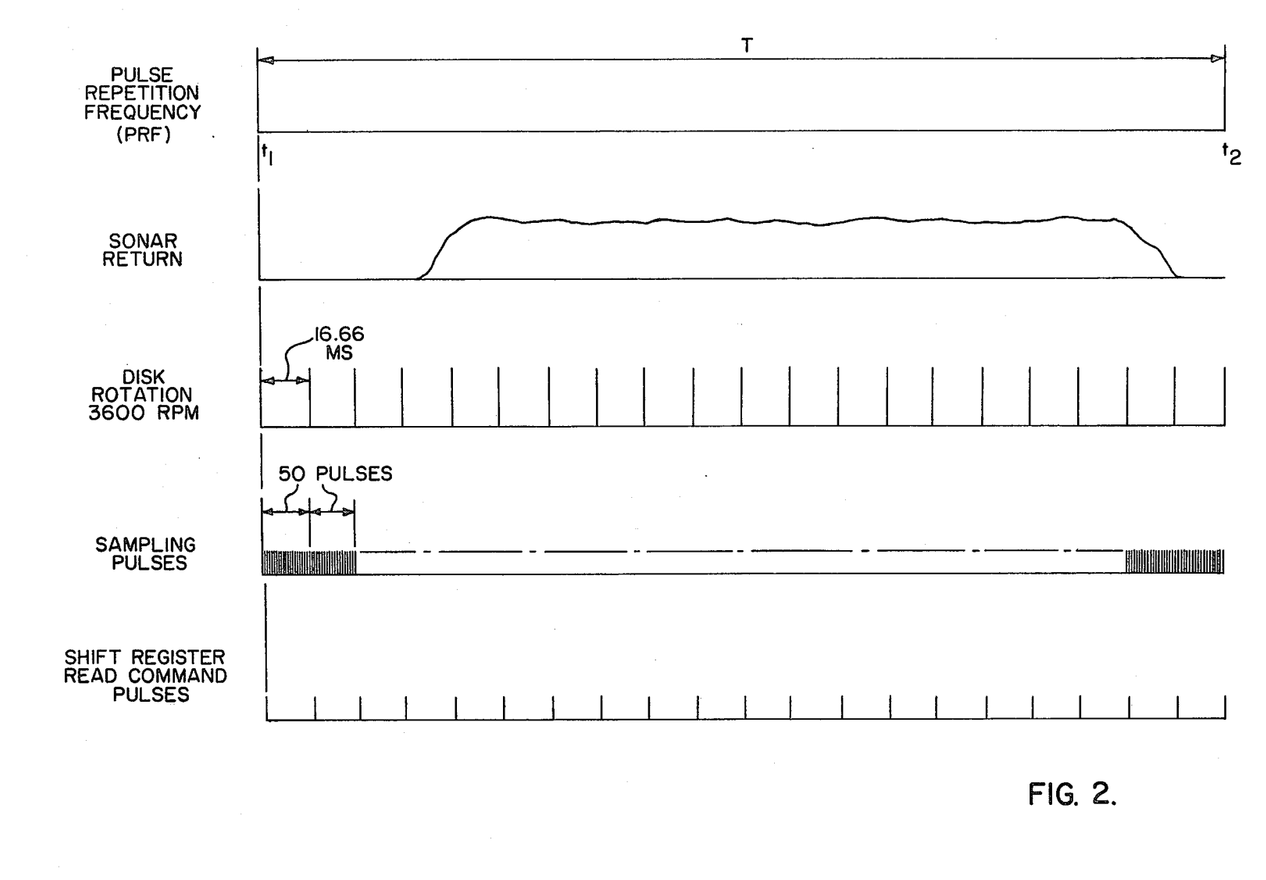
FIG. 2 are waveforms illustrating the operation of FIG. 1.

The operation of one embodiment of the present invention may be explained with reference to FIG. 2 illustrating the occurrence of various events in the operation of the apparatus of FIG. 1. A typical side-looking sonar system may have a pulse repetition frequency (PRF) in the order of 3 Hertz. The PRF diagram of FIG. 2 shows a sonar transmission taking place at time $t_1$ and a second sonar transmission taking place at time $t_2$ with the period T being 333.33 milliseconds, less one-half a TV line time, as will be subsequently explained. At some time after the acoustic transmission takes place at time $t_1$, and before the next transmission at time $t_2$, the acoustic return will come in as illustrated by the sonar return curve of FIG. 2.

The third diagram of FIG. 2 illustrates each complete revolution of the disk for a rotational speed of 3600 rpm with the time between revolutions therefore being 16.66 milliseconds and with approximately 20 revolutions per period T.

A number of sampling pulses are provided during each revolution of the disk to sample the sonar return and in the present example 50 pulses are provided for each revolution making a total of 1000 pulses for each 20 revolutions, with the sampling pulse period being 0.333 milliseconds.

After each group of 50 samples of the return signal are taken and placed into the shift registers, they are read out and placed onto a portion of the rotating disk such that the shift registers are emptied and ready to receive the next group of 50 samples. The shift register read cycle is illustrated by the last waveform of FIG. 2. Although not visible on the time scale illustrated, the duration of the shift register read command is 3.17 microseconds during which time one clock pulse will be provided for each sonar signal value placed in the storage registers. In the present example therefore 50 clock pulses will be provided to empty the shift registers.

Figure 3:
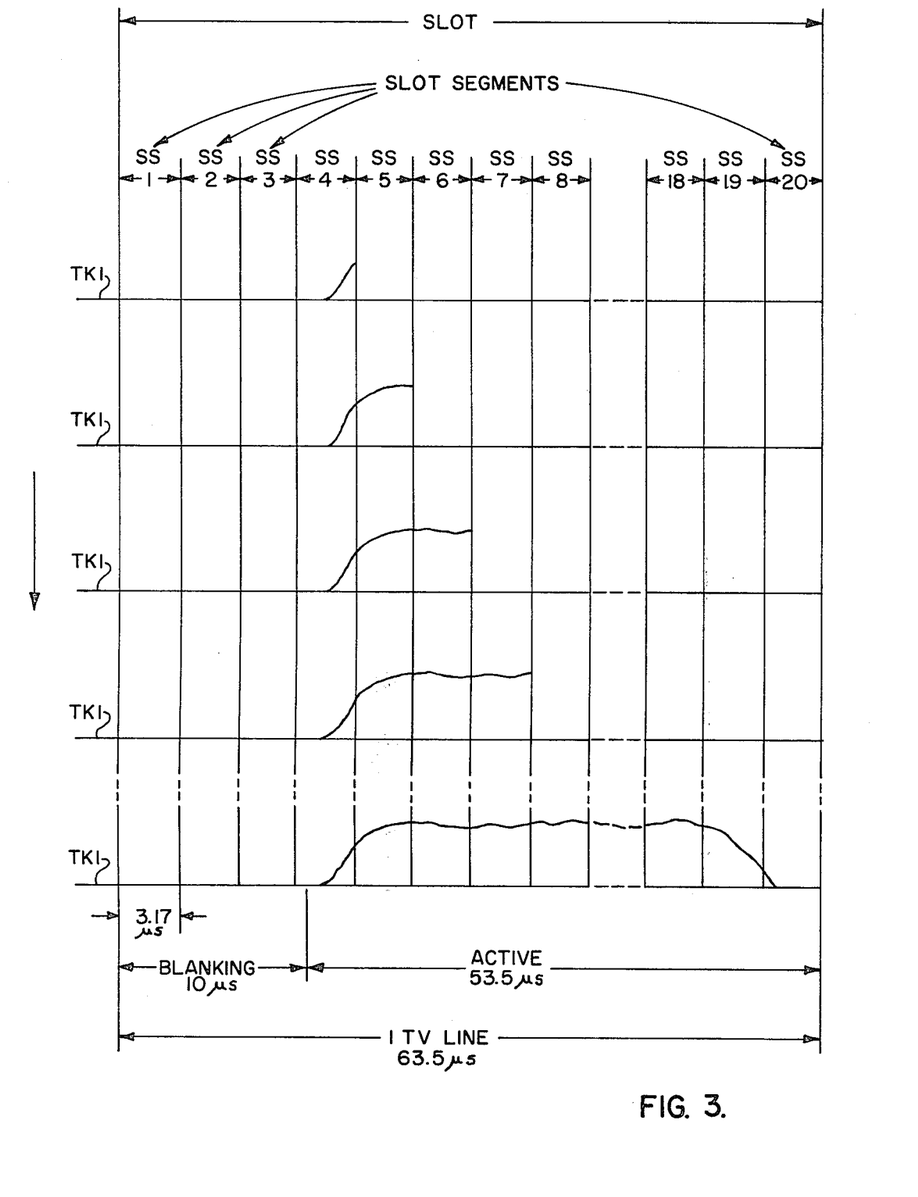
FIG. 3 illustrates the build up of information on the magnetic disk of FIG. 1.

FIG. 3 illustrates the build-up of a sonar return on a track of the disk, and also serves to define several terms used herein. Each complete sonar return from transmission to transmission will eventually occupy, in compressed form, a location on one of the tracks of the disk. This location is herein termed a slot and each slot is comprised of a plurality of segments called slot segments. In the present example there are 20 slot segments, designated SS1 to SS20, per slot.

In operation, after an acoustic transmission, 50 samples of the sonar return are taken during the first revolution of the disk and placed into slot segment 1. Thereafter, groups of 50 samples are taken and placed into subsequent slot slot locations during respective subsequent rotations of the disk. With additional reference to the sonar return of FIG. 2, it is seen that no meaningful information is received for several revolutions of the disk. Accordingly, in FIG. 3 there is no waveform recorded until, for example, slot segment 4. During the next revolution 50 samples are taken and placed into slot segment 5, as illustrated by the second curve of FIG. 3. The process is continued and as illustrated by the remaining curves of FIG. 3, a portion of the sonar return is sampled and placed into adjacent slot segments during each revolution.

The recorded sonar return between transmissions is equivalent to one TV line, and accordingly at the rotational speed of 3600 rpm the time equivalent of one slot is one TV line or 63.5 microseconds. The TV line includes an active portion of 53.5 microseconds, that portion which is actually displayed on the screen, and a blanking portion of 10 microseconds, during which time horizontal retrace occurs. With 20 slot segments per slot, each slot segment would be equivalent to 3.17 microseconds.

Figure 4:
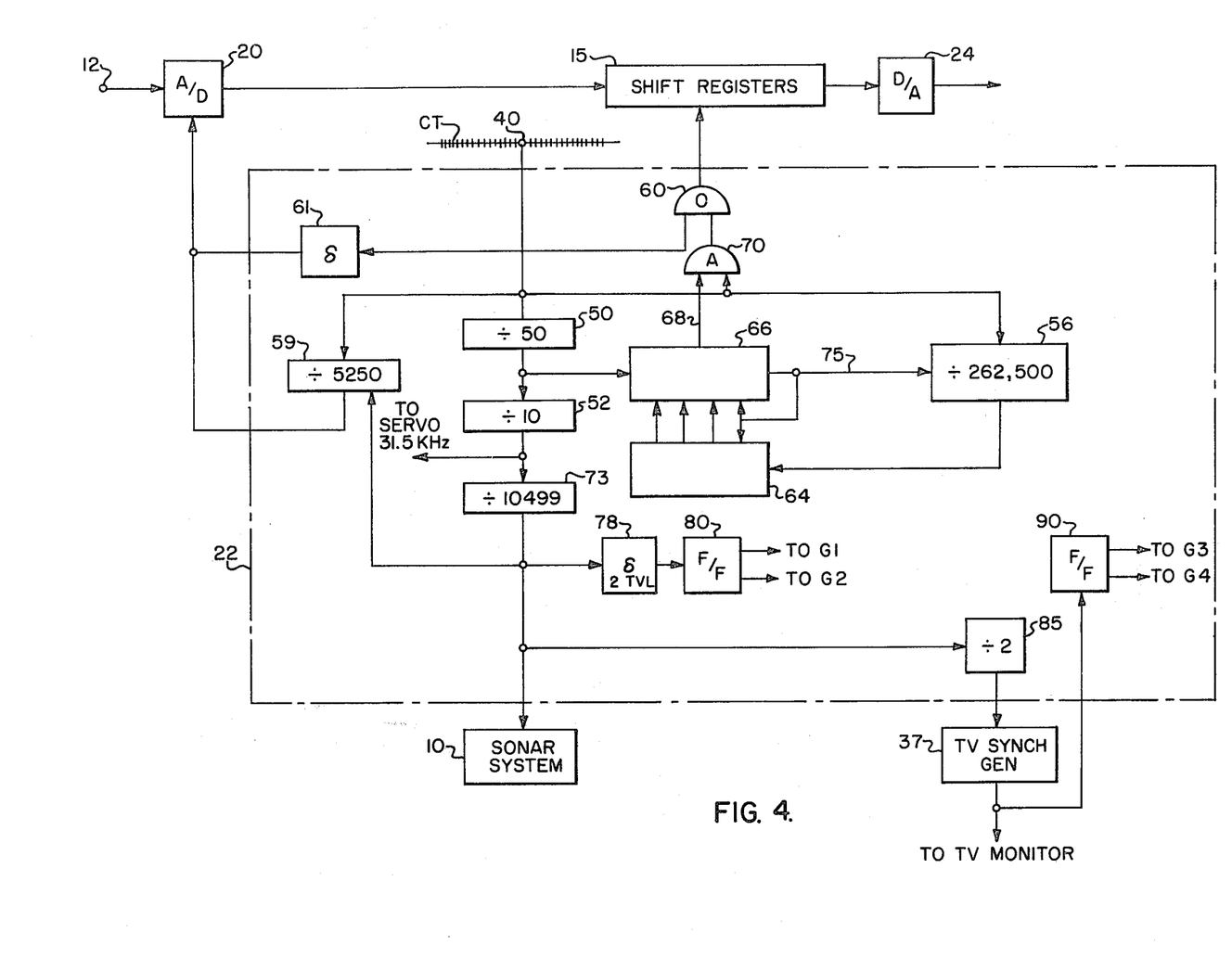
FIG. 4 is a block diagram of the timing and control circuit of FIG. 1.

There are various ways to implement the operation of the present invention and FIG. 4 illustrates by way of example an arrangement for a side looking sonar system with a moving window display. FIG. 4 basically shows in somewhat more detail, the timing and control circuit 22 of FIG. 1 in conjunction with other circuits of FIG. 1.

The clock track CT has a pre-recorded signal thereon consisting of clock pulses having a frequency of 15.75 megahertz which is 1000 times the TV line rate. The read head 40 provides these pulses to a number of circuits, one of which is the divide circuit 50, which is a divide by 50 circuit and operable to provide an output for every 50 input pulses. Since there are 50 clock pulses per slot segment, every output of the divide circuit 50 is indicative of a slot segment. A second divide circuit 52 is a divide by 10 circuit and since there are 20 slot segments per slot, every output of the divide circuit 52 will be indicative of half slots.

The clock pulses are also provided to divide circuit 56 which provides an output when its count reaches 262,500, indicative of one complete revolution of the disk.

In the present example 50 samples of the return signal are taken during each revolution of the disk. Accordingly, the divide circuit 59 provides an output for each 5,250 clock pulses (262,500 divided by 50), the output signal constituting the sonar sample pulse to the analog to digital converter 20 which in response thereto samples, holds and converts the sample to a six bit digital equivalent for placement into the shift register 15.

The output of the divide circuit 59 is also provided to or gate 60, after a suitable delay by delay circuit 61, so as to cause shifting of the converted signals down the shift register unit 15.

For each sonar return, approximately 1,000 samples are to be placed into one slot location with 50 different samples being placed into respective slot segments upon each revolution of the disk. To accomplish this there is provided a first counter 64 which is responsive to the output of the divide circuit 56 for counting the number of revolutions and for transferring that number to a second counter 66 which is responsive to the output of the divide circuit 50 to count slot segments. When the slot segment number is equal to the revolution number, counter 66 will provide an enabling signal on line 68 to an AND gate 70 for a time duration equal to one slot segment. This enabling operation allows the clock pulses to empty the shift registers 15 so that the contents thereof may be converted to an analog form and placed into the proper slot segment.

Figure 5:
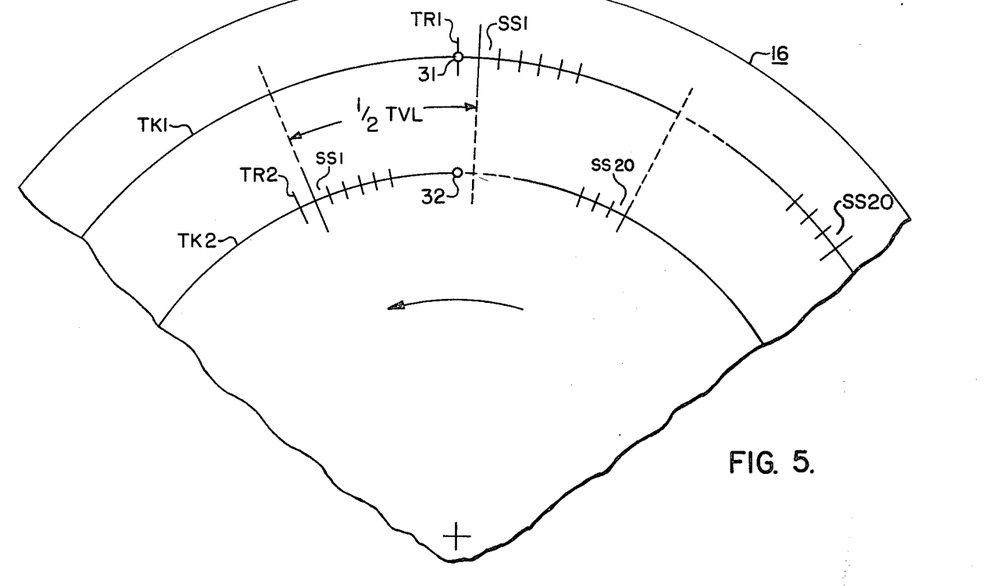
FIGS. 5 and 6 illustrate the disk with two tracks of information written thereon.

By way of example, and with additional reference to FIG. 5 (not to scale) suppose that an acoustic transmission takes place as indicated by the reference mark TR1 (FIG. 5) one slot segment ahead of slot segment SS1 on track TK1. 5,250 clock track pulses past the reference position TR1, the divide circuit 59 will provide an output signal to take the first of 50 samples of the sonar return. When all 50 samples have been taken and placed into the shift registers 15, one complete revolution will have occurred such that divide circuit 56 will advance counter 64 to the count of 1, this number 1 being simultaneously transferred to counter 66. After 50 clock pulses past TR1, divide circuit 50 will provide an output signal (indicating one slot segment) which corresponds to the 1 count in counter 66 such that an enable signal is provided to AND gate 70 to read out the 50 samples in the shift registers at the 15.75 megahertz rate to place them into the first slot segment. During the next revolution 50 more samples are taken, the divide circuit 56 output will advance the counter 64 to the count of 2 and after two slot segments pass the reference TR1, the count will equal the number transferred to counter 66 so that an enabling signal is provided to place the second group of 50 samples into the second slot segment. The sampling process is continued with the counter 64 being advanced upon each revolution of the disk and with counter 66 providing its enabling signal when the slot segment number equals the revolution number.

For a two to one interlace system, the next sonar return will have to be written into a slot location on track TK2. As the side looking sonar apparatus proceeds over a target it is desirable that the observer see a picture on the TV monitor moving as if he were facing the direction of motion of the sonar apparatus. Accordingly, a moving window display is provided wherein the latest returns appear at the top of the TV screen and move downwardly on the screen. As brought out in the aforementioned patent, this moving window type of display may be accomplished by slipping the sync and advancing the vertical synchronizing pulse by one line time. Returning again to the example, the next sonar return will be written in track TK2 at a slot location which is one-half a TV line ahead of the slot previously written into one track TK1. Accordingly, the next acoustic transmission takes place relative to the disk as indicated by the reference mark TR2, one slot segment away from slot segment ss1.

It is seen therefore that the acoustic transmission for writing the second sonar return occurs prior to the time that slot segment ss20 on track TK1 receives its information. This is accomplished in the following manner.

For a 525 line system, there will be 525 half-slots on one track. At 20 revolutions less one-half a TV line, that is one-half of one slot, a subsequent sonar transmission takes place. This is accomplished with the provisions of divide circuit 73 which counts half slots and provides an output signal after the occurrence of 525 × 20 − 1, or 10,499 half slots. This output causes resetting of the divide circuit 59 so that 50 evenly spaced samples can be taken relative to the reference TR2. This resetting prior to reference TR1 has the effect of neglecting the last sampling pulse for slot SS20; however, that value can be assumed to be zero.

Even though a second transmission has taken place, the counter 64 will still have a count of 19 in it and when the reference mark TR1 attains its original position shown, it will indicate a 20th revolution such that the number 20 is transferred to counter 66. After 20 slot segment counts the last enabling signal for that slot will be given to AND gate 70 for reading out the shift registers 15. The trailing edge of the 20th enabling signal is additionally used as a reset signal on line 75 to reset both counters 64 and 66. Since in the present example events are referenced to a new transmission, the reset signal on line 75 will be provided to the divide circuit 56 to reset it to an initial count of 1,550 which would have been the count had it actually started at reference TR2.

The output signal from divide circuit 73 initiating a new transmission, also changes the enabling of gate G1 to gate G2 for writing on track TK2. However, due to the fact that information must still be written into the last slot segment of the slot on track TK1 even though a new transmission has taken place, the enabling of gate G2 is delayed. This is accomplished by the provision of delay circuit 78 which is responsive to the output of the divide circuit 73 to delay it by, for example, two TV line times, to cause flip-flop 80 to switch an enabling output from G1 to G2. Gate G2 is enabled before the first sonar sampling pulse from divide circuit 59 so that the apparatus will write into slot segments ss1 to ss20 in a manner as previously described. After the next transmit command from divide circuit 73, flip-flop 80 will again cause enabling of gate G1, for writing on track TK1. It should be noted that the erase before writing circuitry commonly associated with the disk has not been illustrated.

Figure 6:
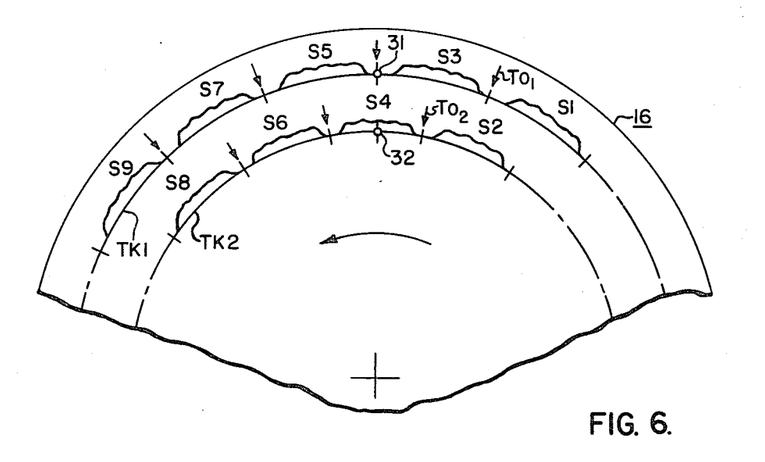

For a particular track, subsequent returns are written ahead of a previous return, as illustrated in FIG. 6. The first return is written into slot S1 on track TK1 and the next return is written into slot S2 on track TK2 one-half a TV line ahead of S1, as explained with respect to FIG. 5. The third return (second odd field signal) to be displayed is written into slot S3 and the fourth is written into S4, etc. With the rotation in the direction of the arrow, it is seen therefore that the latest sonar return will be read out by heads 31 and 32 before older returns such that the latest information appears at the top of the TV display. After each two sonar returns the vertical synchronizing pulse is advanced by one line time to cause the moving window effect. With reference to FIG. 4, this may be accomplished by the provision of a divide by two circuit 85 which will provide an output signal to the TV sync generator 37 after each two sonar transmissions to effect the sync slip.

One complete field will be displayed for each revolution of the disk. Gates G3 and G4 are provided for readout purposes and when G3 is enabled the odd field will be read out and on the very next rotation G4 will be enabled for reading out the even field. The enabling signals for gate G3 and G4 may be provided by the flip-flop 90 which changes states in response to the vertical drive output of the sync generator 37.

Figure 7:
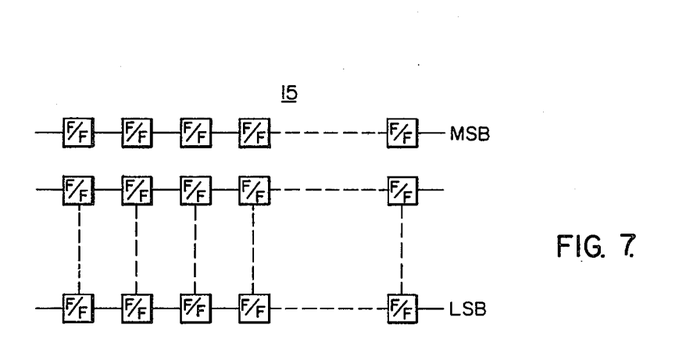
FIG. 7 is a simplified block diagram of the storage register unit of FIG. 1.

FIG. 7 illustrates a shift register arrangement for the shift register unit 15. Each small block represents a flip-flop and a digital signal from the analog to digital converter 20 is presented to the inputs of the left-most column of flip-flops The uppermost flip-flop contains the most significant bit and the lowermost flip-flop, the least significant bit of the digital number. When the next digital signal is presented to the shift register unit 15 the suitably delayed sonar sample pulse from divide circuit 59 causes the previous number to shift one column to the right and the new number to be entered and this shifting will continue for each subsequent input until the shift registers are filled. In general, if there are $N$ samples in the total return and $M$ bits per sample, then an $NM/X$ bit capacity is required, where $X$ is the number of revolutions in the total sampling period. In the aforementioned prior art patent, to obtain 1000 samples of 6-bits each, would require a 6000 flip-flop storage capacity. In the present invention there is required only 300 flip-flops.

Figure 8:
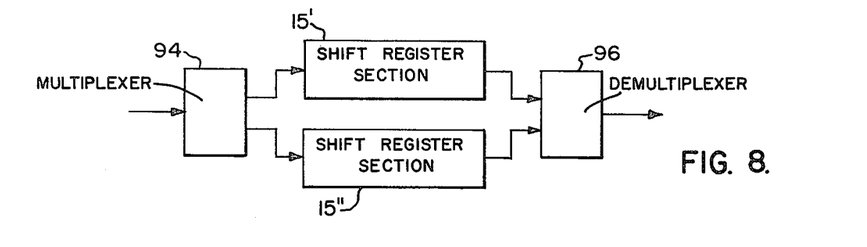
FIGS. 8 and 9 illustrate storage register arrangements for a reduced clock pulse frequency requirement.

After the storage register unit 15 is filled to capacity with 50 samples, the clock pulses are provided to the flip-flops at the clock pulse rate of 15.75 megahertz emptying the shift register unit prior to the next sonar sampling pulse. If desired the register readout rate may be reduced by a factor of two with the arrangement of FIG. 8 wherein the shift register unit is divided into two separate sections 15' and 15'' with each section having half the digital word capacity of the unit shown in FIG. 7. A digital signal from the analog to digital converter is presented to a multiplexer 94 which places alternate digital samples into alternate sections. When the clock pulses are provided for reading out the stored values, a demultiplexer 96 alternately passes in sequence, first a word from one section and then a word from the other section.

Figure 9:
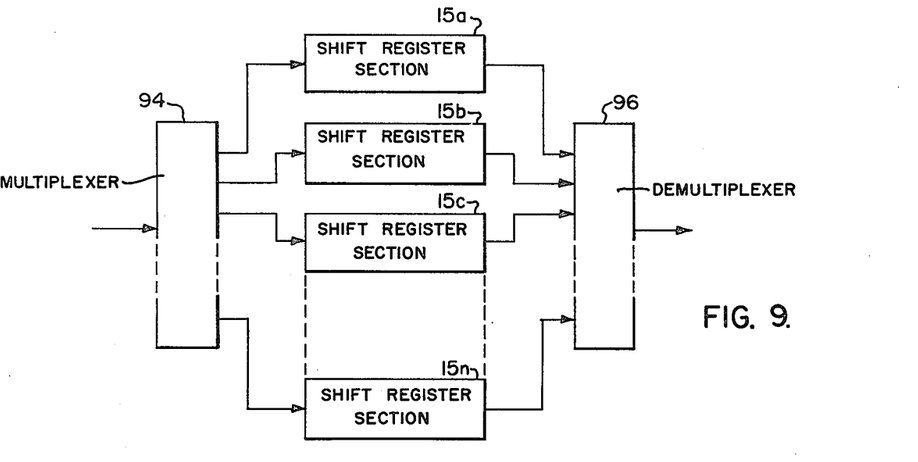

In general, the data rate can be reduced by a factor of $n$ from that required for the arrangement of FIG. 7, by providing $n$ sections of the storage register unit as indicated in FIG. 9 where the sections have been labeled 15$a$ to 15$n$. Multiplexer 94 and demultiplexer 96 are provided to perform the same function as with respect to the arrangement of FIG. 8.

Figure 10:
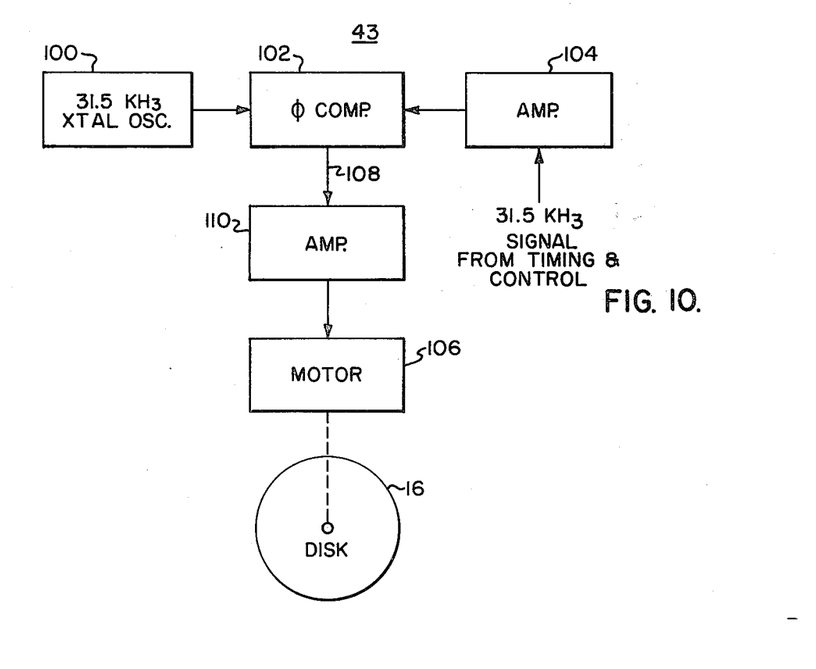
FIG. 10 illustrates the servo system for controlling disk speed.

One form of well known servocontrol drive 43 illustrated in FIG. 1 is shown in somewhat more detail in FIG. 10. A stable crystal oscillator 100 provides a 31.5 kilohertz signal to a phase comparison circuit 102. The other input to the phase comparison circuit is a 31.5 kilohertz signal derived from the clock track of the disk and provided by the output of the divide circuit 52 in FIG. 4. This signal is presented to the phase comparison circuit 102 after being amplified by amplifier 104. As long as the signal derived from the track is equal to the signal from the stable crystal oscillator, motor 106 will drive the disk 16 at the proper 3600 rpm speed. Should this speed deviate, the phase comparison circuit 102 will sense a difference and provide an error signal on line 108 which is amplified by amplifier 110 and presented to the motor 106 to correct the disk speed until the frequencies of the oscillator and track derived signals are again equal.

Accordingly, a system has been provided which, by filling and emptying a shift register unit once per disk rotation, a substantial saving in required shift register capacity is realized. In the example given, the capacity is reduced by a factor of 20, representing an appreciable reduction in mechanization cost.

Although the invention was described with respect to a moving window side looking sonar system it finds applicability in other systems such as slow scan TV transmission over phone lines. In the slow scan TV case, there is no requirement for a moving window display and slow scan TV lines would be sampled and placed into slot locations one behind the other, on two different tracks, as opposed to one in front of the other as shown in FIGS. 5 and 6.

Additionally, a greater or fewer number of samples may be taken, than that described by way of example, and the apparatus permits display of the entire or any portion of the system signal across the full active width of the display, at the discretion of the designer.

We claim as our invention:

1. Scan conversion apparatus comprising:
   A. display means for displaying multiple lines of information on a display area;
   B. means for providing multiple sequential input signals indicative of a condition to be displayed on said display means as display signals;
   C. first storage means;
   D. means for periodically sampling a said input signal and placing each sampled value into said first storage means at a first rate;
   E. second storage means;
   F. means for reading out said stored sampled values periodically during the period between successive input signals and placing said read out values into said second storage means at a second rate, as portions of a display signal; and
   G. means for reading out all of said stored portions of a display signal to provide a total display signal to be displayed as a line on said display means.

2. Apparatus according to claim 1 which includes
   A. circuit means for relatively moving the displayed picture relative to the display area.

3. Apparatus according to claim 1 wherein:
   A. said means for periodically sampling includes an analog to digital converter; and
   B. said first storage means includes a plurality of shift registers.

4. Apparatus according to claim 1 wherein:
   A. said second storage means is a rotating magnetic video disk having a constant rate of rotation.

5. Apparatus according to claim 4 wherein:
   A. said display means is a TV monitor incorporating a 2 to 1 odd-even field interlace and
   B. the rotational rate of said disk is equal the field rate of said TV monitor.

6. Apparatus according to claim 4 wherein:
   A. approximately $N$ total samples of said input signal are taken;
   B. there are substantially $X$ number of revolutions of said disk between successive input signals; and
   C. $N/X$ samples of said input signal are taken per disk revolution.

7. Apparatus according to claim 4 wherein:
   A. said first storage means is loaded and unloaded once for every revolution of said disk.

8. Apparatus according to claim 7 wherein:
   A. each processed return signal is stored in a slot location on a track of said disk,
   B. each said slot location being made up of a plurality of slot segments;

C. the means for reading out said sampled values stored in said first register means being operable on successive disk rotations to place said read out values into successive ones of said slot locations.

* * * * *